Patented Feb. 12, 1952

2,585,867

UNITED STATES PATENT OFFICE 2,585,867

PROCESS FOR POLYMERIZING ISOOLEFINS USING METHYL CHLORIDE SOLUTION OF BF₃ AS CATALYST

William J. Sparks, Westfield, N. J., and Robert M. Thomas, Baton Rouge, La., assignors, by mesne assignments, to Jasco, Incorporated, a corporation of Delaware No Drawing. Application March 5, 1948, Serial No. 13,342

2 Claims. (Cl. 260—85.3)

This invention relates to polymers, interpolymers or copolymers of hydrocarbon unsaturates; relates particularly to the preparation of such polymers at low temperature by a Friedel-Crafts catalyst; and relates especially to the preparation of such polymers by the use of dissolved boron trifluoride as catalyst.

It has been found possible to prepare a considerable number of high molecular weight polymeric substances by the procedure of cooling hydrocarbon unsaturates to temperatures below room temperature and polymerizing the cold unsaturates by the use of a Friedel-Crafts catalyst; to produce such substances as simple polybutene; the copolymer of a major proportion of isobutylene with a minor proportion of a multiolefin to yield a substitute for rubber; a copolymer of isobutylene and styrene in the form of a somewhat leathery, flexible polymer; and polymers of relatively high proportions of a diolefin with smaller proportions of a mono-olefin other than isobutylene to yield a hard resin suitable for paint and varnish resins, moulding compositions, simple polydiolefins such as polymethylpentadiene, and the like.

Also, it has been found possible to prepare high molecular weight polymers of isobutylene by the application thereto of gaseous boron trifluoride at low temperatures ranging from 0° C. down to temperatures as low as —103° C. or even lower. It has also been found possible to prepare interpolymers of an iso-olefin, such as isobutylene, with a diolefin, such as butadiene, by the application to mixtures of the two at temperatures ranging from about —40° C. to —103° C. or even lower of an active polymerization catalyst in the form of aluminum chloride dissolved in a low freezing, non-complex forming solvent; these polymers being solid, rubber-like substances, capable of a curing action with sulfur to yield a valuable rubber substitute. To the present, however, it has not been found possible to prepare any such curable solid polymers by the use of gaseous boron trifluoride, as it is utilized for the preparation of high molecular weight polymers of pure iso-olefins.

It is now found possible, however, to dissolve boron trifluoride in a solvent such as methyl or ethyl or propyl chloride or carbon disulfide or ethylene dichloride or chloroform or other alkyl mono- or polyhalide having less than about 6 carbon atoms. Also similar solutions of boron trifluoride in other solvents such as the lower hydrocarbons of from about 2 to 6 or 8 carbon atoms per molecule are usable. These include such hydrocarbons as ethylene, ethane, propane, butane, and the like. When such a solution of boron trifluoride is applied to a chilled mixture of an iso-olefin such as isobutylene with a diolefin such as butadiene or isoprene or piperylene or dimethyl butadiene or 2-3, propyl, 1-3 butadiene, or the like, there is obtained a high molecular weight interpolymer or copolymer containing a suitable percentage of residual unsaturation which is reactive with sulfur or with a quinone diocime or a dinitroso compound, or the like, in a curing reaction to produce a rubbery substance having most of the characteristics of natural rubber, including a high elongation upon tension and a forcible retraction upon the release of tension to approximately original size and shape, together with a good tensile strength, a high flexure resistance and a high abrasion resistance.

The value of the solution of boron trifluoride in the described solvents is not limited to the manufacture of this copolymer, since it produces a very high molecular weight simple polybutene from pure material, much higher than can be obtained from gaseous boron trifluoride, and produces a good polymer from polybutene containing substantial amounts of impurities, such that with gaseous boron fluoride, only low polymers are obtained.

Similarly, the dissolved boron fluoride may be applied to cold mixtures of isobutylene and styrene at temperatures ranging from about —6° C. down to about —103° C. for the production of a copolymer of isobutylene and styrene. This copolymer does not cure readily with sulfur or the dioximes or the dinitroso compounds, but it does have a substantial tensile strength and a fair amount of flexibility, although it does not show the elongation characteristic of rubber. These properties are found in copolymers having molecular weights ranging from 2000 or 2000 up to 100,000.

Similarly, the solution of boron fluoride may be used as a catalyst in the production of resinous copolymers of relatively large amounts of butadiene or other diolefins with mono-olefins either branched or normal having from 5 to about 20 carbon atoms per molecule. In this procedure the temperature required are not as low as in the previously described embodiments, temperatures ranging from about +15° down to about —35° C. being preferred.

Thus, an object of the invention is to polymerize or copolymerize ethylenic unsaturates or hydrocarbon substituted ethylenes having from 4 to 20 carbon atoms per molecule at temperatures below about +15° C. down to —164° C. by the application thereto, in the presence of a diluent, if desired, of a solution of boron trifluoride and a carbonaceous solvent having from 1 to 8 inclusive carbon atoms per molecule; and either a hydrocarbon, or a sulfur or halogen-substituted aliphatic radical; the solvent being characterized by a freezing point below 0° C. and freedom from the formation of complexes with the boron fluoride. Other objects and details of the invention will be apparent from the following description:

In practising the invention, the first requirement is the polymerizate material. This material is most readily defined as a hydrocarbon substituted ethylene having from 4 to 20 carbon atoms per molecule. The simplest polymerizate material is merely isobutylene which can be polymerized very readily into a polybutene having a Staudinger molecular weight number within the range between about 1000 and 500,000; by the application of boron trifluoride dissolved in the solvents above outlined. Alternatively, mixtures of isobutylene may be prepared with a wide range of multiolefins for the preparation of substitutes for natural rubber. In these copolymers, the preferred material is a major proportion of isobutylene with a minor proportion of a multiolefin having from 4 to 14 carbon atoms per molecule. Butadiene is an excellent copolymerizate; isoprene is the commercially preferred copolymerizate; piperylene; dimethyl butadiene; 2-methyl, 3-ethyl butadiene; 2-methyl, 3-propyl butadiene; 2-methyl, 3-butyl butadiene, myrcene; allo-ocymene; dimethallyl; 2-methyl, 3-heptyl butadiene; 2-methyl, 3-hexyl butadiene; 2-methyl, 3-heptyl butadiene; 2-methyl, 3-octyl butadiene and 2-methyl, 3-nonyl butadiene being similarly readily copolymerizable. It may be noted that the preferred multiolefins have a conjugated system of double bonds, at least one of which is terminal, and a methyl substituent on the second carbon is desirable, but this is not essential, since the straight linear compounds will copolymerize and the substituent may be upon the 2, 3 or 4 carbon, as is most convenient; nor is it necessary that the unsaturation be conjugated.

In practicing this form of the invention, a mixture of the desired olefin and diolefin is prepared, cooled internally or externally to a relatively low temperature ranging from —40° C. to —103° C., or even lower to —150° C. or —165° C. Simultaneously, a solution of boron trifluoride is prepared in a suitable solvent such as an alkyl halide of the type of ethyl or methyl chloride or fluoride or in a hydrocarbon solvent such as liquid ethylene, or ethane; cooled to a suitable low temperature approximating that of the cooled mixture of olefin and diolefin, and applied to the olefinic mixture, preferably in a well subdivided form. The polymerization proceeds rapidly to yield the desired polymer.

EXAMPLE 1

A mixture of 94 parts of isobutylene with 6 parts of butadiene was prepared with 200 parts of liquid ethylene. The liquid ethylene served to lower the temperature of the mixture to approximately —98° C. At some convenient time, a slow stream of gaseous boron trifluoride was passed through a diffusing tip into 100 parts of liquid methyl chloride at a temperature of approximately —78° C. The solution was continued until a considerable quantity of boron trifluoride had dissolved, the amount being such as to bring the solution to approximately one half of saturation. (Alternatively, the boron trifluoride may be passed in to full saturation, and then the solution diluted with an equal volume of methyl or ethyl chloride.) The prepared catalyst solution was then placed in a blow-case and pressure applied thereto by compressed nitrogen. The pressure forced the catalyst solution through a misting-nozzle onto the surface of the reaction mixture of olefins. The reaction mixture was agitated rapidly to secure a quick incorporation of the catalyst spray into the olefin mixture. The interpolymer formed promptly in small white particles. The spray of catalyst solution was continued for a period of approximately 5 minutes in order to polymerize from one half to four-fifths of the total reactants in the mixture. Approximately 30 parts of isopropyl alcohol were then added to the mixture to prevent further polymerization, and the solid polymer was separated from the residual reaction mix.

The polymer was then washed in boiling water, dried, and compounded with approximately 3 parts of sulfur per 100 of interpolymer, together with approximately 3 parts of stearic acid and 5 parts of zinc oxide. The compounded mixture was prepared by milling the polymer with the additional substances in the Banbury mixer, and then approximately 1 part of a sulfurization aid such as tetramethyl thiuram disulfide was added on an open mill, and the mixture was then cured by the application of a temperature of approximately 155° C. for a time of 15 minutes to 60 minutes. Test samples cut from the cured material showed an elongation ranging from 800% to 1200% and a tensile strength at break of approximately 2000 pounds per square inch.

The cured copolymer was found to have an exceedingly high ozone resistance, both in the form of pure gum, and when loaded with a wide variety of other substances.

The relative proportions of isobutylene and butadiene are subject to variation, and the resulting polymers after curing have different tensile strength as the amount of butadiene in the reaction mixture is varied.

Table

| Per Cent Butadiene in the Reactant Mix | Tensile Strength of Cured Interpolymer in lbs. per sq. in. |
|---|---|
| 4 | 1,300 |
| 6 | 2,200 |
| 8 | 1,970 |
| 10 | 1,950 |
| 15 | 1,430 |
| 20 | blistered |

EXAMPLE 2

A mixture of approximately 3 parts of dimethyl butadiene and 97 parts of isobutylene was cooled to a temperature of approximately —98° C. by the admixture of 100 parts of liquid ethylene. Simultaneously, a stream of boron trifluoride gas was passed through a diffusing tip into 100 parts of liquid ethylene for a short period of time. The resulting solution of $BF_3$ was then added rapidly to the reaction mixture of isobutylene and dimethyl butadiene. The copolymer appeared quickly and the addition of the catalyst solution was continued for a period of approximately five minutes to polymerize somewhat more than one half of the reactants in the polymerization mixture. Isopropyl alcohol was then added as in Example 1 to arrest the polymerization, and the polymer was separated from the mix, washed, dried, and compounded with sulfur, stearic acid, zinc oxide and a sulfurization aid as before. The cured polymer showed a high elongation and elasticity, ranging from 800% to 1200%, a good tensile strength of approximately 2800 pounds per square inch, and a similarly high resistance to abrasion ozone, oxygen, etc.

EXAMPLE 3

A similar mixture was prepared consisting of approximately 99.5 parts of isobutylene of good purity (approximately 96%) with 0.5 part of isoprene of good purity (about 91%). To this mixture there was then added approximately 300 parts by weight of pulverized solid carbon dioxide to cool it to a temperature of about −78° C. Simultaneously, a stream of boron trifluoride gas was passed through a diffusing tip into 100 parts of liquid methyl chloride at a temperature of approximately −78° C. until a solution containing approximately 5% of boron trifluoride was obtained. This catalyst solution was then incorporated rapidly in finely divided form into the cold mixture of isobutylene and isoprene over a time interval of approximately 5 minutes. The polymerization proceeded promptly, and continued until approximately two-thirds of the reactants had polymerized. The mixture was then dumped into a body of rapidly stirred warm water to drive off the residual reactants and destroy the catalyst. This solid polymer was then removed from the water, dried and compounded with carbon black, zinc oxide and stearic acid, as above indicated, on an open mill. When the other components were well admixed, approximately 1 part of para quinone dioxime, and approximately 1 part of lead dioxide were added quickly to the compound on the mill. The compound was then removed and cured under heat and pressure to yield a finished product having a good tensile strength, a good elongation, and substantially no tackiness.

EXAMPLE 4

A similar mixture was prepared consisting of approximately 99.5 parts of isobutylene of good purity (approximately 96%) with 0.5 part of piperylene of good purity. To this mixture there was then added approximately 300 parts by weight of pulverized solid carbon dioxide. Simultaneously, a stream of boron trifluoride gas was passed through a diffusing tip into 100 parts of liquid methyl chloride at a temperature of approximately −78° C. until a solution containing approximately 5% of boron trifluoride was obtained. This catalyst solution was then incorporated rapidly in finely divided form into the cold mixture of isobutylene and piperylene over a time interval of approximately 5 minutes. The polymerization proceeded promptly, and continued until approximately two-thirds of the reactants had polymerized. The mixture was then dumped into a body of rapidly stirred warm water to drive off the residual reactants and destroy the catalyst. The solid polymer was then removed from the water, dried and compounded with carbon black, zinc oxide and stearic acid, as above indicated, on an open mill. When the other components were well admixed, approximately 1 part of para quinone dioxime, and approximately 1 part of lead dioxide were added quickly to the compound on the mill. The compound was then removed and cured under heat and pressure to yield a finished product having a good tensile strength, a good elongation, and substantially no tackiness.

These examples show the making of various copolymers which are replacements for natural rubber and they show only a limited number of multiolefins. However, any of the multiolefins, as above pointed out, having from 4 to 14 carbon atoms per molecule are similarly copolymerizable into copolymers of varying characteristics and varying utilities. The invention is, moreover, applicable to many other polymerization reactions.

EXAMPLE 5

A quantity of isobutylene of about 96.5% purity was cooled to a temperature of about −88° C. by the addition of liquid ethane as a diluent and internal refrigerant. Simultaneously, a solution of boron fluoride in liquid ethane in a concentration of approximately 5% was prepared and added to the cold isobutylene-ethane mixture at a temperature close to −88° C. The catalyst solution was well stirred in during the course of the addition and the polymerization proceeded at extremely high speed to yield a polymer of isobutylene having an average Staudinger molecular weight number of approximately 150,000.

The reaction proceeds equally well in the presence of many other unsaturates, and the catalyst is not poisoned by the presence of aromatic nuclei.

EXAMPLE 6

A mixture of approximately 60 parts of isobutylene of 98% purity with 40 parts of styrene having a purity close to 99% was prepared and cooled by the addition of about 3 volumes of liquid ethane. To this mixture there was then added a solution of boron trifluoride in ethylene dichloride in approximately 20% concentration, the catalyst solution being well stirred in. The polymerization reaction proceeded promptly to yield a copolymer of isobutylene and styrene which could be calendered, extruded and similarly treated. It was found to have a Staudinger molecular weight number of about 25,000 and could be sheeted out on the calender into a leathery, flexible sheet of reasonably good strength and a translucency just short of transparency.

This reaction proceeds excellently with other proportions of isobutylene and styrene from 10% to 90% styrene and it proceeds well with alkylated styrenes such as para methyl styrene and alpha methyl styrene, and initial tests indicate that the reaction proceeds equally well, or better, without regard to the size of alkyl substituent in the ring; and without regard to the size of the substituent in the alpha position, but not quite so well. Some substituents in the beta position reduce the polymerizability, but do not wholly prevent polymerization.

The reaction is not limited to the making of rubbery or flexible polymers, but it is equally effective in the making of resinous copolymers.

EXAMPLE 7

A mixture was prepared consisting of 60 parts of butadiene of approximately 98% purity with 40 parts of the octene known as "dimer," prepared by dimerizing isobutylene. This mixture was cooled to a temperature of approximately −24° C. as set by the presence of approximately 2 volumes of methyl chloride; and a 2% solution of boron trifluoride in methyl chloride was added to the cold mixture. There was produced a prompt copolymerization reaction yielding an excellent resin having a melting point in the neighborhood of 96° C.; a conchoidal fracture, a faintly yellow color, and an excellent solubility in linseed oil, tung oil, and the like, in which it could be bodied to yield an excellent paint and varnish resin. The molecular weight was found to lie within the range between about 5000 and about 25,000, depending in part upon the lowness of the temperature, in part upon the amount of catalyst solution added, and, in part, upon the proportions of butadiene and dimer. It was found that a good resin of good strength and adequate molecular weight could be obtained over a range of butadiene and dimer mixtures between 40% butadiene to 90% butadiene.

Similarly, all of the other multiolefins above disclosed were found to be copolymerizable to yield resins of the same character, there being minor differences in color, molecular weight, hardness, and the like. Similarly, any of the straight chain or branched mono-olefins from 5 carbon atoms to 20 carbon atoms could be substituted for the octane used, again with minor changes only in the properties and characteristics of the resin obtained. It may be noted that the extreme readiness of polymerization of isobutylene causes it to yield either a rubbery or flexible polymer since it is practically always present in from very large proportion, to major proportion, in any polymer produced from a mixture containing it, and the configuration characteristics of the isobutylene yield a rubbery type of polymer. In contrast, the 5 carbon atoms and higher monoolefins yield sufficiently different configurations to destroy the elasticity of the molecule; and also the presence of relatively large quantities of copolymerized butadiene permits of direct crosslinkage between molecules to produce an interlocking which still further limits the elasticity of the large molecule.

Nevertheless, it is found that any mixture of mono-olefin and multiolefin within the range between 10% and 90% of either component yields a usable polymer when polymerized by dissolved boron fluoride. At temperatures only slightly below room temperature, it is possible to produce oily polymers of high value as lubricant additives. By the use of lower temperatures and other mixtures, it is possible to produce rubbery polymers and flexible, leathery polymers as well as hard resin polymers. The character of the polymer is controlled in large part by the choice of unsaturate or choice of more than one unsaturate, the proportion between the respective unsaturates, the presence of impurities or catalyst poisons, and the like.

It may be noted that while butene-1 and butene-2 can be polymerized with butadiene into a resin, they serve in the production of a rubbery polymer as control agents and they do not necessarily copolymerize, but do modify the course of the reaction.

As above pointed out, the requirements upon the catalyst solvent are relatively strict with respect to two items and very lax with respect to other items. That is, the catalyst solvent must have a freezing point not too far above the polymerization temperature, which, for most purposes, requires a freezing point below 0° C. It is not necessary that the catalyst solvent be liquid at the polymerization temperature, since it can be added to the cold polymerizate at a temperature above its freezing point, with the dissolved boron fluoride, and it is promptly dissolved in the cold polymerizate mixture before freezing occurs. The most severe limitation upon the catalyst solvent is that it shall not form a complex with the boron fluoride, by which it is meant that the solution shall be wholly volatile at a temperature close to the boiling point of the solvent, with no residue boiling at a different or higher boiling point produced, and, in general, that the addition to, or extraction from, the solution of boron fluoride shall yield a small, steady change in boiling point. These requirements are readily met by any of the lower aliphatic compounds containing chlorine or fluorine substituents and are met by most of the lower boiling hydrocarbons including ethylene, ethane, propane, pentane, hexane, light naphtha, and the like. They are also met by carbon disulfide and by sulfur dioxide. They are also met by sulphuryl chloride and a considerable range of analogous compounds. The preferred catalyst solvents may be described as consisting of an aliphatic radical having from 1 to 8 carbon atoms per molecule with a substituent selected from the group consisting of hydrogen, chlorine, fluorine and sulfur.

It does not appear that the concentration of boron trifluoride in the catalyst solution is particularly critical, since satisfactory results are obtainable with amounts of dissolved boron trifluoride ranging from 0.1% to about 25%. The preferred concentration is found to lie between about 0.5% and about 5%, since higher concentrations are difficult to control. It is found that an amount of boron trifluoride ranging from 0.2% to about 3% of the total amount of reactants is required for the complete polymerization of all of the reactants, depending upon the percentage of loss by volatilization of the boron trifluoride with the volatilized refrigerant. When relatively little boron trifluoride is lost by boiling out with the internal refrigerant, a concentration of catalyst solution above about 10% results in a quantity of catalyst too small to be applied conveniently and the application arrested short of complete polymerization of the mixture.

It is also found that there is a difference in the effectiveness of the catalyst solution, depending upon the type of solvent used and the solubility of the boron trifluoride in it, and that this difference in effectiveness is shown by a difference in the degree of interpolymerization and a difference in the attainable molecular weight with different reaction mixes.

The most efficient catalyst solvent known at present is a low freezing alkyl halide such as ethyl or methyl chloride. In the preparation of such a catalyst solution, the boron trifluoride may be dissolved under varying conditions of temperature and pressure. It is found that a solution of boron trifluoride in catalyst solvent which is saturated at the boiling point of the solvent shows no serious tendency to separate out at lower temperatures.

This application is a continuation-in-part of our application Serial No. 248,525, filed December 30, 1938, now abandoned, and our application Serial No. 300,336, filed October 20, 1939 now U. S. Patent No. 2,356,128; also our application Serial No. 452,912, filed July 30, 1942, now abandoned; and the essentials for the making of the hard resin are shown in our application Serial No. 414,682, filed October 11, 1941, now abandoned.

One of the component elements in our present invention is a mono-olefin which is described as having from 4 to 20 inclusive carbon atoms per molecule, and examples are shown using isobutylene and the octene known as "dimer." However, all of the other mono-olefins are similarly usable for one purpose or another within the spirit of the present invention including such elements as butene-1 and butene-2, the various pentenes, both linear and branched chain, the various hexenes, likewise linear and branched chain, the various heptenes, octenes, nonenes, decenes, undecenes, duodecenes, both normal and branched, without regard to the position of the unsaturated linkage and without regard to the location of substituents. Similarly, the other compounds having from 13 to 20 carbon atoms, whether linear or branched, and without regard to the position of substituents, are likewise useful. It may be noted, however, that a substantial control can be had over the characteristics of the polymer obtained, by choice of the mono-olefin. It may be noted that mono-olefins having the unsaturation in the 1 position and a methyl substituent on the 2 carbon polymerize more readily and polymerize to higher molecular weight substances. On the other hand, the normal olefins tend to polymerize to lower molecular weight, more resistant polymers which are of a special value for lubricant additives, paint films, and the like, depending upon the proportion of multiolefin and the character thereof which has been added.

While there are above disclosed but a limited number of embodiments of this invention, it is possible to produce still other embodiments without departing from the inventive concepts herein disclosed, and it is requested that only such limitations be attached to the appended claims as are stated therein or required by the prior art.

The invention claimed is:

1. The method of polymerizing a mixture of a mono-olefin and a multiolefin in which the mono-olefin has from 4 to 20 inclusive carbon atoms per molecule and is present in the proportion between 10% and 90%, and the multiolefin has from 4 to 14 inclusive carbon atoms per molecule, and is likewise present in the proportion between 10% and 90%, comprising the steps in combination of cooling the material to a temperature within the range between $-40°$ and $-103°$ C. and copolymerizing the two unsaturates by the steps of adding thereto at the low temperature boron fluoride in solution in methyl chloride to produce a polymeric body having a molecular weight within the range between 25,000 and 150,000.

2. The method of copolymerizing isobutylene in major proportion and isoprene in minor proportion comprising the steps of cooling the mixture to a temperature within the range between $-40°$ C. and $-103°$ C. and copolymerizing it by the addition thereto of a solution of boron fluoride in methyl chloride to produce a polymeric body having a molecular weight within the range between 25,000 and 150,000.

WILLIAM J. SPARKS.
ROBERT M. THOMAS.

REFERENCES CITED

The following references are of record in the file of this patent:

UNITED STATES PATENTS

| Number | Name | Date |
| --- | --- | --- |
| 2,142,980 | Huijser | Jan. 3, 1939 |
| 2,221,000 | Kuentzel | Nov. 12, 1940 |
| 2,271,636 | Frolich | Feb. 3, 1942 |
| 2,332,194 | Beekley | Oct. 19, 1943 |
| 2,434,552 | Elmore | Jan. 13, 1948 |